(12) United States Patent
Hagen

(10) Patent No.: US 10,245,942 B2
(45) Date of Patent: Apr. 2, 2019

(54) OPERATING MEDIUM TANK ARRANGEMENT FOR A MOTOR VEHICLE

(71) Applicant: AUDI AG, Ingolstadt (DE)

(72) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 15/229,900

(22) Filed: Aug. 5, 2016

(65) Prior Publication Data

US 2017/0036533 A1 Feb. 9, 2017

(30) Foreign Application Priority Data

Aug. 6, 2015 (DE) ........................ 10 2015 010 354

(51) Int. Cl.
*B60K 15/04* (2006.01)
*B60K 15/035* (2006.01)

(52) U.S. Cl.
CPC ............ *B60K 15/04* (2013.01); *B60K 15/035* (2013.01); *B60K 2015/03509* (2013.01);
(Continued)

(58) Field of Classification Search
CPC .................. B60K 15/04; B60K 15/035; B60K 2015/03509; B60K 2015/03552; B60K 2015/0458; B60K 2015/0461
See application file for complete search history.

(56) References Cited

U.S. PATENT DOCUMENTS 4,701,198 A * 10/1987 Uranishi ............ B01D 19/0063
123/519
5,740,842 A 4/1998 Maier et al.
(Continued)

FOREIGN PATENT DOCUMENTS

CN 101245749 A 8/2008
CN 103328250 A 9/2013
(Continued)

OTHER PUBLICATIONS

Chinese Search Report dated Apr. 2, 2018 with respect to counterpart Chinese patent application 201610634394.5.
(Continued)

*Primary Examiner* — Timothy L Maust
*Assistant Examiner* — Timothy P. Kelly
(74) *Attorney, Agent, or Firm* — Henry M. Feiereisen LLC

(57) ABSTRACT

An operating medium tank arrangement for a motor vehicle includes an operating medium tank; a filling tube for refueling the operating medium tank, wherein the filling tube is fluidly connected on one side to the operating medium tank and on the other side has an insertion opening for receiving a refueling device; a guide insert arranged in the filling tube for guiding the refueling device; and a liquid separator including a separator chamber which is divided into a first sub-chamber and a second sub-chamber, wherein the first sub-chamber is fluidly connected to the operating medium tank via a ventilation line, wherein the second sub-chamber is fluidly connected to a filter device, wherein the separator chamber is fluidly connected to the filling tube for purging operating medium separated in the liquid separator into the filling tube, and wherein the first sub-chamber and the second sub-chamber are fluidly connected with each other via a labyrinth separator which is formed by the liquid separator and the filling tube.

10 Claims, 3 Drawing Sheets

(52) U.S. Cl.
CPC ............... *B60K 2015/03552* (2013.01); *B60K 2015/0458* (2013.01); *B60K 2015/0461* (2013.01)

(56) References Cited

U.S. PATENT DOCUMENTS

| | | | |
|---|---|---|---|
| 5,860,460 | A | 1/1999 | Hidano et al. |
| 8,607,765 | B2 | 12/2013 | Hagen |
| 8,931,523 | B2 | 1/2015 | Hagen et al. |
| 8,955,496 | B2 | 2/2015 | Hagen |
| 8,967,193 | B2 | 3/2015 | Hagen |
| 9,163,591 | B2 | 10/2015 | Hagen |
| 9,174,529 | B2 | 11/2015 | Hagen |
| 9,239,032 | B2 | 1/2016 | Hagen |
| 9,243,593 | B2 | 1/2016 | Hagen |
| 9,360,353 | B2 | 6/2016 | Hagen |
| 9,382,878 | B2 | 7/2016 | Hagen |
| 2007/0068595 | A1 | 3/2007 | Ganachaud |
| 2008/0184972 | A1 | 8/2008 | Ehrman et al. |
| 2009/0025822 | A1 | 1/2009 | Rittershofer |
| 2012/0111307 | A1 | 5/2012 | Hagen |
| 2012/0152489 | A1 | 6/2012 | Hagen |
| 2012/0160218 | A1 | 6/2012 | Hagen |
| 2012/0160220 | A1 | 6/2012 | Hagen |
| 2012/0175379 | A1 | 7/2012 | Hagen |
| 2012/0179354 | A1 | 7/2012 | Hagen |
| 2013/0306665 | A1* | 11/2013 | Eberhardt .............. B60K 15/04 220/746 |

FOREIGN PATENT DOCUMENTS

| | | |
|---|---|---|
| CN | 203780307 U | 8/2014 |
| DE | 196 05 922 A1 | 8/1996 |
| DE | 20 2008 001 586 U1 | 7/2008 |
| JP | H 02175434 A | 7/1990 |
| JP | 2010-976 A | 1/2010 |

OTHER PUBLICATIONS

Translation of Chinese Search Report dated Apr. 2, 2018 with respect to counterpart Chinese patent application 201610634394.5.

* cited by examiner

OPERATING MEDIUM TANK ARRANGEMENT FOR A MOTOR VEHICLE

CROSS-REFERENCES TO RELATED APPLICATIONS

This application claims the priority of German Patent Application, Serial No. 10 2015 010 354.7, filed Aug. 6, 2015, pursuant to 35 U.S.C. 119(a)-(d), the content of which is incorporated herein by reference in its entirety as if fully set forth herein.

BACKGROUND OF THE INVENTION

The present invention relates to an operating medium tank arrangement for a motor vehicle.

The following discussion of related art is provided to assist the reader in understanding the advantages of the invention, and is not to be construed as an admission that this related art is prior art to this invention.

An operating medium arrangement is assigned to the motor vehicle or forms a part of the motor vehicle. It serves for storing or temporarily storing fuel, which can in particular be used for operating a drive aggregate of the motor vehicle. Operating medium includes for example fuel, in particular benzene or diesel. In this case the operating medium tank can be referred to as fuel tank and the operating medium tank arrangement as fuel tank arrangement.

The operating medium tank arrangement includes the operating medium tank which is preferably constructed as a pressure tank. During operation of the motor vehicle or the operating medium a positive pressure of at least 300 bar, at least 400 bar or at least 500 bar prevails in such a pressure tank relative to the pressure in the environment external to the operating medium tank arrangement. This means that it may be necessary to ventilate the operating medium tank in order to at least temporarily reduce the over pressure. This is for example the case during refueling or when the pressure in the operating medium tank exceeds a defined pressure. For ventilation of the operating medium tank for example a ventilation device is provided.

Fluidly connected to the operating medium tank is the filling tube. The filling tube serves for refueling the operating medium tank, i.e., for introducing operating medium into the operating medium tank. For this purpose the filling tube has the insertion opening for receiving the refueling device on its side that faces away from the operating medium tank. The refueling device is for example configured in the form of a pump nozzle. The insertion opening of the filling tube is closable so that during a normal operation or during driving of the motor vehicle no fluid connection is present between the interior of the operating medium tank and the external environment via the insertion opening. Usually the insertion opening is only made accessible for introducing the refueling device and thus introduction of the operating medium into the operating medium tank.

In the filling tube the guide insert is provided which in particular serves for guiding the refueling device. After introducing the refueling device through the insertion opening into the filling tube at least regions of the refueling device are thus supported by the guide insert and the refueling device is hereby preferably at least partially, in particular completely engaged around in circumferential direction. In addition the liquid separator is assigned to the filling tube. The liquid separator serves for separating liquid or liquid operating medium from the mixture of liquid operating medium, gaseous operating medium and air in any ratios.

The liquid separator is for example used during ventilation of the operating medium tank. For this purpose the liquid separator is connected to the operating medium tank via the ventilation line. In addition the liquid separator is fluidly connected with the filter device and with the filling tube. During ventilation of the operating medium tank the aforementioned mixture is supplied to the liquid separator via the ventilation line. A ventilation valve may be arranged in the ventilation line by means of which the ventilation line can be released or blocked. As an alternative the ventilation valve can also be arranged fluidly between the liquid separator and the filter device.

The operating medium tank is ventilated in the direction of the filter device, which is for example configured as an activated carbon filter. Preferably the liquid separator is or can be fluidly connected with the external environment via the filter device. During the ventilation liquid operating medium is to be removed from the mixture as far as possible and the mixture is then to further flow in the direction of the filter device. The liquid operating medium separated by the liquid separator can enter the filling tube and through the filling tube flow back into the operating medium tank. For this purpose the filling tube is preferably permanently fluidly connected with the operating medium tank, in particular when the insertion opening is closed.

The liquid separator is preferably arranged on the filling tube, in particular fastened on the filling tube, in particular welded to the filling tube. Beside the liquid separator of course a further liquid separator can be provided. The further liquid separator is for example connected upstream of the liquid separator to the ventilation line or is arranged on the ventilation line. The mixture supplied to the liquid separator via the ventilation line can insofar have been conducted beforehand through the further liquid separator so that a part of the liquid operating medium was already separated in the further liquid separator.

It would be desirable and advantageous to provide an improved operating medium tank arrangement that has advantages compared to known operating medium tank arrangements, in particular a more reliable separation of the liquid operating medium from the mixture.

SUMMARY OF THE INVENTION

According to one aspect of the present invention, an operating medium tank arrangement for a motor vehicle includes an operating medium tank; a filling tube for refueling the operating medium tank, wherein the filling tube is fluidly connected on one side to the operating medium tank and on the other side has an insertion opening for receiving a refueling device; a guide insert arranged in the filling tube for guiding the refueling device; and a liquid separator including a separator chamber which is divided into a first sub-chamber and a second sub-chamber, wherein the first sub-chamber is fluidly connected to the operating medium tank via a ventilation line, wherein the second sub-chamber is fluidly connected to a filter device, wherein the separator chamber is fluidly connected to the filling tube for purging operating medium separated in the liquid separator into the filling tube, and wherein the first sub-chamber and the second sub-chamber are fluidly connected with each other via a labyrinth separator which is formed by the liquid separator and the filling tube.

The term labyrinth separator means a device for separating liquid operating medium from the mixture, during which separation the mixture is deflected once or multiple times so that the liquid operating medium, due to its higher inertia, is carried out of the mixture. The labyrinth separator can insofar also be referred to as inertia separator. The labyrinth separator is formed by the liquid separator and the filling tube together. This means that the deflection of flow of the mixture is caused on one hand by an element of the liquid separator and on the other hand by an element of the filling tube. In particular the flow labyrinth of the labyrinth separator is present between the liquid separator and the filling tube or is delimited by these and thus formed by these. For this purpose the separator housing and the filling tube for example have corresponding elements. In the case of the filling tube this element can for example be formed by the guide insert or be present at the guide insert.

Such a configuration of the operating medium tank arrangement achieves on one hand a very high efficiency of separation of the liquid operating medium from the mixture and on the other hand a high degree of integration of the liquid separator with the filling tube. The latter has a positive effect on the required installation space. Due to the fact that the liquid separator equipped with the labyrinth separator operates very efficiently the further liquid separator described above is not required. The here described liquid separator can insofar be the sole liquid separator via which the ventilation of the operating medium tank is accomplished.

Accordion to another advantageous feature of the invention, the separator chamber is formed in a separator housing of the liquid separator, wherein the first sub-chamber is separated from the second sub-chamber by at least one separating web arranged in the separator housing. The separator housing is for example configured cup-shaped or pot-shaped, i.e., it has an outer sheath surface, which is closed on one side by a bottom wall surface and is open on the other side and is fastened on the filling tube. The separator chamber is delimited by the outer sheath surface and the bottom wall surface, however it does not extend into the filling tube but is rather delimited by an imagined separating surface between the liquid separator and the filling tube. In the separator chamber the at least one separator web is present which separates the first sub-chamber from the second sub-chamber. The separating web hereby preferably extends through the entire separator housing, i.e., it rests against the bottom wall surface and opposing sides of the sheath surface so that the separating web traverses the entire separating space. This results in a very large separating volume.

Accordion to another advantageous feature of the invention, the separating web is arranged so as to overlap with a deflection web of the guide insert. The separating web preferably extends out of the separating housing into the filling tube. This means that the separating web protrudes toward the guide insert. On the other hand the guide insert has the deflection web which protrudes in the direction of the liquid separator, in particular in the direction of or even into the separator housing. For example the separating web may, but does not have to, engage into the separator housing and thus into the separator chamber. The separator web protrudes toward the guide insert and the deflection web toward the liquid separator to such a degree that the separator web and the deflection web are arranged so as to overlap each other. This means the separator web and the deflection web are arranged adjacent each other when viewed in a direction parallel to a longitudinal center axis of the filling tube.

Accordion to another advantageous feature of the invention, the deflection web engages between the separating web and a further separating web, which is arranged in the separator housing. Beside the separating web the further separating web is thus provided in the separator housing. The same explanations with regard to the separating web analogously apply to the further separating web. The further separating web is arranged adjacent the separating web so that the deflection web engages between the separating web and the further separating web. The separating web, the further separating web and the deflection web are thus situated adjacent each other with regard to a straight line running parallel to the longitudinal center axis of the filling tube so that the separating web as well as the further separating web are arranged so as to overlap with the deflection web. Such a configuration achieves a multiple deflection of flow or a multiple deflection of the mixture so that the liquid operating medium can be separated very effectively from the mixture.

Accordion to another advantageous feature of the invention, the further separating web extends further toward the guide insert than the separating web. For example the further separating web is arranged parallel to the separating web. The further separating web extends further toward the guide insert or further into the filling tube than the separating web. Correspondingly the separating web is preferably situated at a greater distance to the guide insert than the further separating web. In this way a targeted and almost complete deflection of the mixture can be achieved.

Accordion to another advantageous feature of the invention, the liquid separator has multiple, in particular semicircular, support webs that protrude into the filling tube and which support the separating web and the further separating web respectively on both sides. Each of the support webs thus engages on the separating web and the further separating web so that these are supported. The support webs in particular engage on the side of the separating web and the further separating web which faces away from the bottom wall surface so that the separating web and the further separating web are not caused to vibrate. The support webs are preferably a part of the separator housing and particularly preferably extend as far as into the filling tube. The support webs can be configured semicircular, i.e., they can be curved in circumferential direction with respect to a longitudinal center axis of the separator housing so that they have a constant distance to the longitudinal center axis in radial direction.

Accordion to another advantageous feature of the invention, a closure flap is pivotally supported on the guide insert which closure flap is movable to assume a first position in which it closes a first guide tube of the guide insert for receiving a refueling device on a side of the first guide tube that faces toward the liquid separator and to assume a second position in which the closure flap permits access to the first guide tube. The guide insert has the first guide tube, which serves for guiding the refueling device. The first guide tube is preferably arranged on a side of the filling tube, which with respect to the liquid separator faces toward the insertion opening. Insofar the first filling tube is located closer to the insertion opening than the liquid separator. The closure flap serves for selectively closing or permitting access to the first filling tube. For this purpose the closure flap is pivotally supported in the guide insert, in particular on the first guide tube.

In the first position the guide insert is closed by the closure flap. In the second position on the other hand the first filling tube is released. For example the closure flap is impinged with a spring force, which is oriented so that the closure cap is urged in the direction toward the first position or into the first position. Preferably during insertion of the refueling device into the first filling tube the closure flap, due to the force exerted by the refueling device on the closure flap, is displaced from the first position in the direction of or into the second position. The closure cap is preferably made of an electrically conductive material, in particular metal. In addition the closure flap is particularly preferably electrically connected with a body of the motor vehicle. The closure flap is for example arranged so that it is in constant contact with the refueling device, in particular an electrically conductive region of the refueling device, during refueling the operating medium tank by means of the refueling device. This ensures a potential compensation between the motor vehicle and the refueling device.

Accordion to another advantageous feature of the invention, the guide insert can have a second guide tube for receiving the refueling device, which second guide tube is spaced apart from the first guide tube, wherein the deflection web is arranged on the second guide tube. In axial direction relative to the longitudinal center axis of the guide tube the second filling tube is arranged spaced apart from the first guide tube and is hereby preferably arranged further from the insertion opening than the first filling tube. For example the second guide tube is located in axial direction so as to overlap with the liquid separator. Correspondingly the deflection web can be arranged on the second guide tube.

The second guide tube has for example the same inner diameter as the first guide tube. The second guide tube also serves preferably for guiding or supporting the refueling device. During refueling of the operating medium tank by means of the refueling device the refueling device thus traverses the first guide tube completely and protrudes as far as into the second guide tube. By means of the second guide tube a backsplash of operating medium can be reliably prevented also when the operating medium tank is completely filled and the filling tube is partially filled with operating medium.

Accordion to another advantageous feature of the invention, the separating web, the further separating web and the deflection web extend parallel to each other. Such a configuration was mentioned above. Correspondingly a flow deflection of 180° is realized by the separating web, the further separating web and the deflection web. The mixture is conducted by the deflection web into an intermediate space located between the separating web and the further separating web, which intermediate space on its side that faces away from the guide insert, extends preferably as far as to the bottom wall surface of the separator housing. As a result of the flow deflection by 180° that occurs in this intermediate space the liquid operating medium can be separated from the mixture very efficiently.

Accordion to another advantageous feature of the invention, the separating web, the further separating web and the deflection web are angled relative to a plane that is perpendicular to the longitudinal center axis of the second filling tube. This means that the mentioned webs are not parallel to the imagined plane but rather form angles with the imagined plane. The angle is hereby greater than 0° and smaller than 180°. Preferably the angle is smaller than 90°. For example the angle is at least 10°, at least 20°, at least 30°, at least 40° or at least 45°. In this way the very space saving configuration of the liquid separator is realized while at the same time ensuring a high separation efficiency.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
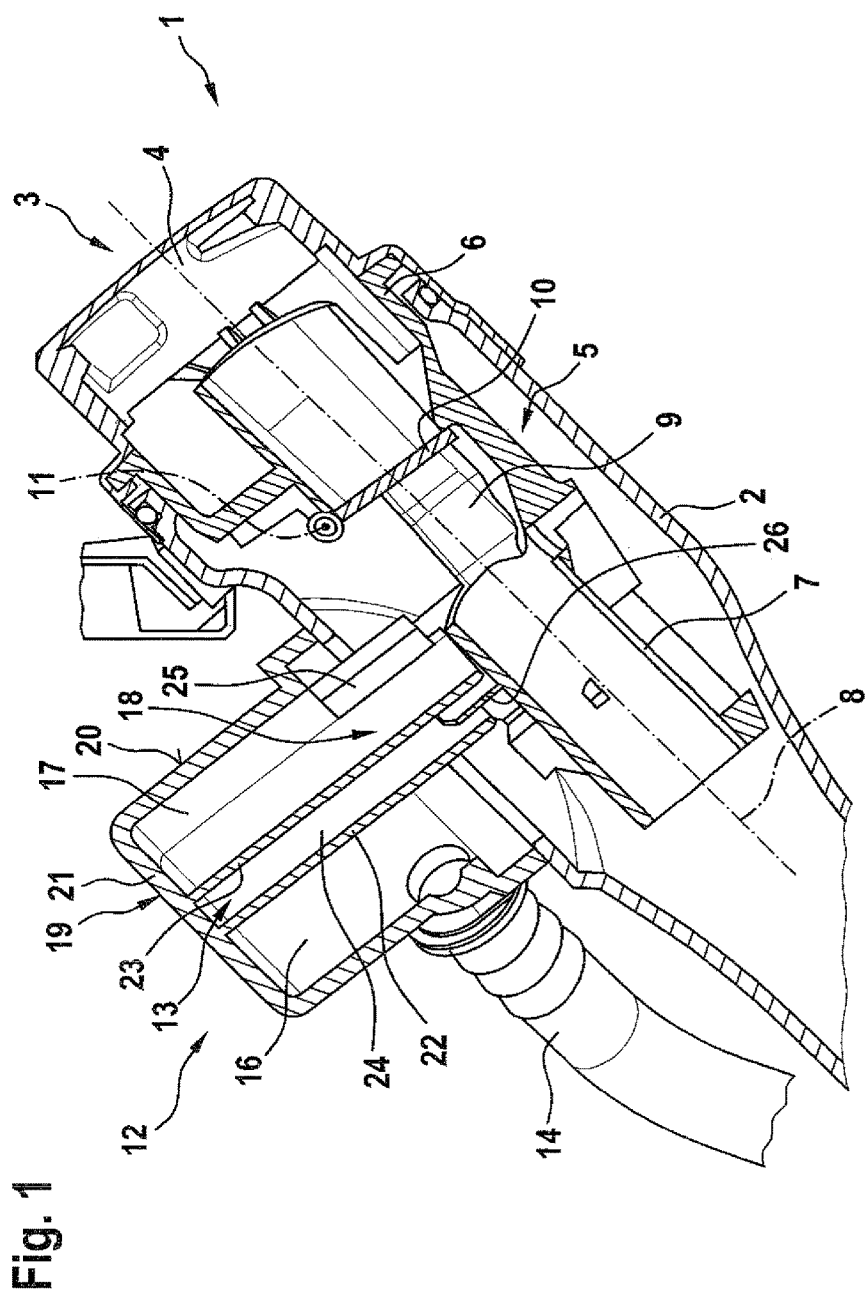
FIG. 1 shows a longitudinal section through a region of an operating medium tank arrangement, more specifically through a filling tube and a liquid separator, wherein in the filling tube a guide insert for a refueling device is arranged.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a longitudinal section through a region of an operating medium tank arrangement 1, which has a here not further shown operating medium tank and a filling tube 2. The filling tube 2 serves for refueling the operating medium tank with operating medium. For this purpose the filling tube 2 is fluidly connected on one side with the operating medium tank. On the other side the filling tube has an insertion opening 3 for a here not further shown refueling device. The insertion opening 3 is closed or covered by a cover lid 4, when no refueling is performed. For refueling the cover lid 4 is displaced for permitting access to the insertion opening 3 and the refueling device is introduced into the filling tube 2.

For guiding the refueling device a guide insert 5 is arranged in the filling tube 2, which guide insert is inserted into the filling tube 2 during installation of the operating medium tank arrangement 1. The guide insert 5 has a first guide tube 6 and a second guide tube 7 which are arranged spaced apart from each other in axial direction relative to a longitudinal center axis 8 of the guide insert 5 or the guide tubes 6 and 7. Preferably the guide tubes 6 and 7 are each configured continuous in circumferential direction so that they can engage fully around the refueling device when arranged in the filling tube 2. The filling tubes 6 and 7 are preferably connected with each other by means of at least one holding web 9. The first filling tube 6 is located on the side of the second filling tube 7, which faces the insertion opening 3. The first filling tube 6 is insofar located closer to the insertion opening 3 than the second filling tube 7.

Assigned to the first filling tube 6 is a closure flap 10, which is supported on the guide insert 5 or the first guide tube 6 for pivoting about a pivot axis 11. The closure flap 10 is preferably made of an electrically conductive material and is electrically conductively connected with a body of the motor vehicle. The closure flap 10 is arranged so as to be elastically deflected when introducing the refueling device into the filling tube 2. The closure flap 10 is hereby spring loaded so that it is always urged against the refueling device and is thus always in contact with an electrically conductive region of the refueling device. Correspondingly a potential equalization can be achieved with the closure cap 10 between the refueling device and the motor vehicle.

The operating medium tank arrangement 1 also has a liquid separator 12. The liquid separator serves for separating liquid operating medium from a mixture of air, gaseous operating medium and liquid operating medium in variable proportions. The liquid separator 12 has a separating space 13 which is connected on one side to the operating medium tank via a ventilation line 14. On the other side the separating space 13 is or can be fluidly connected with a filter device in particular an activated carbon filter device via a here not shown connection 15.

The liquid separator 12 or the separator chamber 13 is also in flow communication with the filling tube 2 so that separated operating medium can flow through the filling tube 2 in the direction of the operating medium tank. The ventilation line 14 is connected to a first sub-chamber 16 and the filter device to a second sub-chamber 17 of the separating space 13. The first sub-chamber 16 and the second sub-chamber 17 are in flow communication with each other via a labyrinth separator 18. The labyrinth separator 18 is formed by the liquid separator and the filling tube 2 or the guide insert 5.

The separator chamber 13 is present in a separator housing 19 of the liquid separator 12, which for example has a sheath surface 20 and a bottom wall surface 21 and is open toward the filling tube 2. The separator housing 19 is fastened in the filling tube 2, for example by a materially bonding connection. In the separator chamber 13 a separating web 22 and a further separating web 23 are present. The separating web 22 is arranged between the first sub-chamber 16 and an intermediate space 24 of the separating space 13; the further separating web 23 is arranged between the intermediate space 24 and the second sub-chamber 17. The two separating webs 22 and 23 preferably traverse the entire separator housing 19. In particular they extend from the bottom wall surface 21 as far as into the filling tube 2. Hereby they rest against opposing sides of the sheath wall surface 20.

The separating webs 22 and 23 can for example be stabilized by means of support webs 25, wherein the support webs 25 in particular engage on the side of the separating webs 22 and 23 which faces away from the bottom wall surface 21. It can clearly be seen that the further separating web 23 extends further toward the guide insert 5 or the second guide tube 7 than the separating web 22. Preferably a gap of at most 2 mm, at most 1 mm or at most 0.5 mm is present between the further separating web 23 and the guide tube 7.

The guide insert 5, in particular the second guide tube 7, has a deflection web 26, which extends in the direction of the liquid separator 12, and in particular engages between the separating webs 22 and 23. The deflection web 26 thus protrudes into the intermediate space 24. The separating webs 22 and 23 and the deflection web 26 preferably extend parallel to each other. Hereby they form an angle with an imagined plane, which is perpendicular to the longitudinal center axis 8. This means that the webs 22, 23 and 26 are not arranged parallel to this plane but rather form an angle with the plane, which is greater than 0° and smaller than 180°.

When ventilating the operating medium tank in such a configuration of the operating medium tank arrangement 1 via the ventilation line 14, the mixture first flows into the first sub-chamber 14. From this first sub-chamber the mixture can enter the filling tube 2. Because for ventilation a flow connection extends in the direction of the external environment via the filter device and thus the second sub-chamber 17, the mixture flows in this direction. In order to enter the second sub-chamber 17 the mixture has to either flow through the filling tube 2 around the guide insert 5 or alternatively through the labyrinth separator 18. Correspondingly the mixture is first conducted into the intermediate space 24 in which its flow is deflected by 180°. Subsequently the mixture can flow into the second sub-chamber 17, which is in particular accomplished via the filling tube 2. In particular by deflection into the intermediate space 24 a particularly effective separation of the liquid operating medium from the mixture is achieved.

Figure 2:
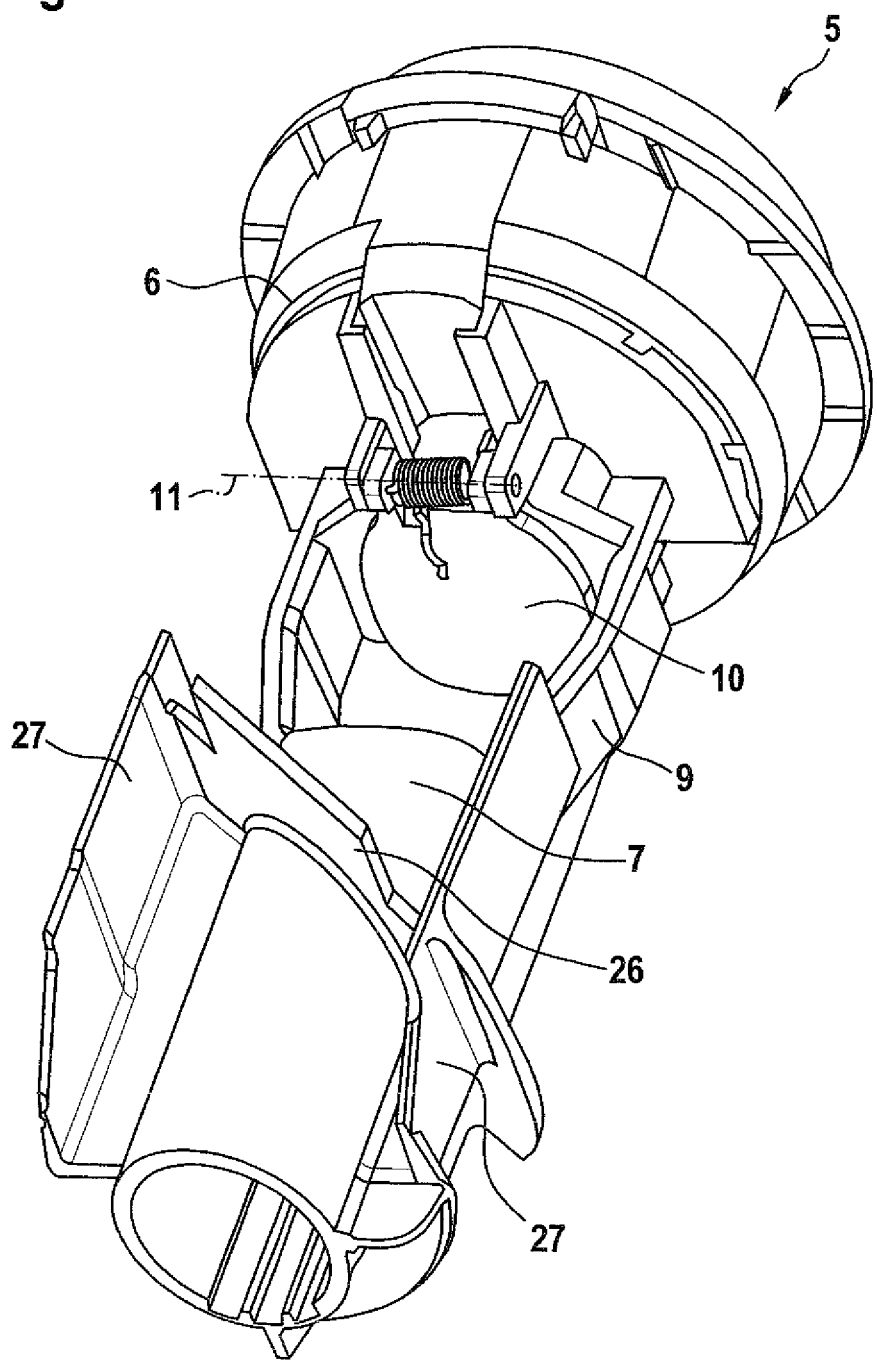
FIG. 2 shows a detail view of the guide insert.

FIG. 2 shows representation of the guide insert 5. Flow guide webs 27 can be seen which extend substantially parallel to the longitudinal center axis 8. Preferably such a flow guide web 27 is proved on either side of the deflection web 26. The flow guide webs 7 are also present on the second filling tube 7. For example the closure flap 10 is configured so that when the guide tube 6 is fully released as a result of insertion of the refueling device it subsequently rests against the support web 25 or one of the support webs 25 and is supported there.

Figure 3:
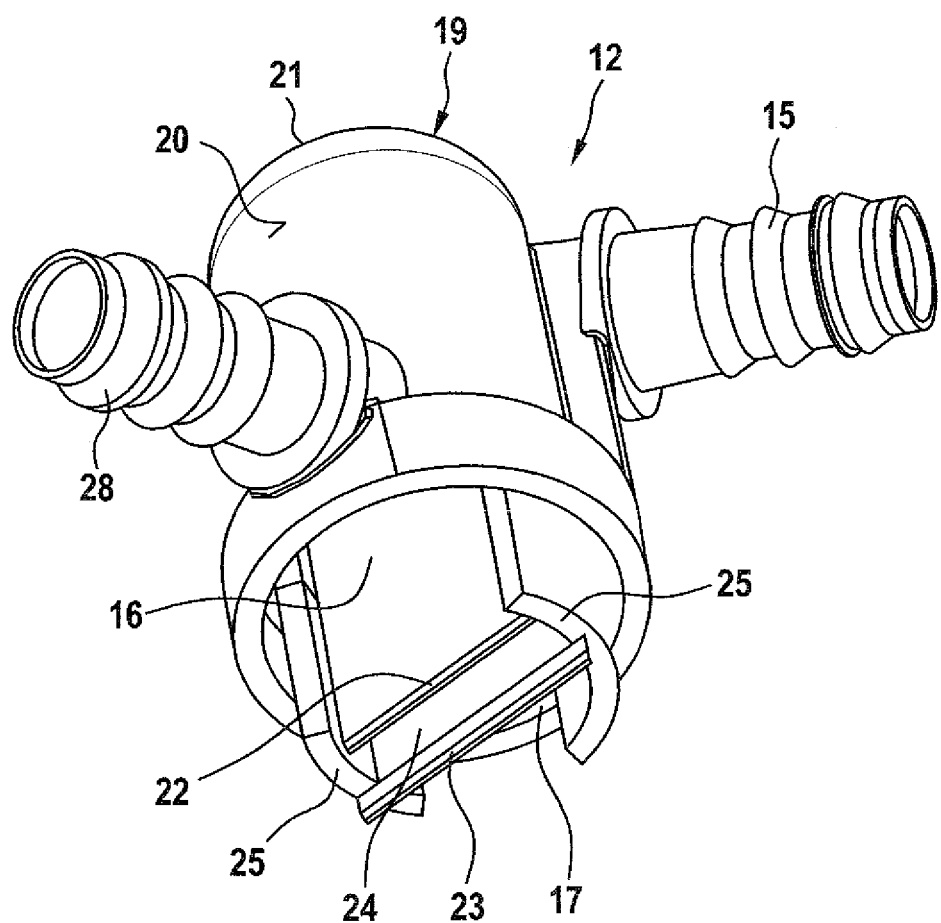
FIG. 3 shows a detail view of the liquid separator.

FIG. 3 shows a detail view of the liquid separator 12. A connection 28 can be seen to which the ventilation line 14 can be connected and the connection 15. FIG. 3 also illustrates that the support webs 25 extend curved in circumferential direction relative to a longitudinal center axis of the separator housing 19.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An operating medium tank arrangement for a motor vehicle, comprising:
    an operating medium tank;
    a filling tube for refueling the operating medium tank, said filling tube being fluidly connected on one side to the operating medium tank and on the other side has an insertion opening for receiving a refueling device;
    a guide insert arranged in the filling tube for guiding the refueling device; and
    a liquid separator comprising a separator chamber which is divided into a first sub-chamber and a second sub-chamber, said first sub-chamber being fluidly connected to the operating medium tank via a ventilation line, said second sub-chamber being fluidly connected to a filter device, said separator chamber being fluidly connected to the filling tube for purging operating medium separated in the liquid separator into the filling tube,
    said first sub-chamber and said second sub-chamber being fluidly connected with each other via a labyrinth separator which is formed by the liquid separator and the filling tube,
    wherein the separator chamber is formed in a separator housing of the liquid separator, said first sub-chamber being separated from the second sub-chamber by at least one separating web arranged in the separator housing, wherein the at least one separating web traverses the entire separator housing.

2. The operating medium tank arrangement of claim 1, wherein the guide insert has a deflection web and wherein the at least one separating web is arranged so as to overlap with the deflection web of the guide insert.

3. The operating medium tank arrangement of claim 2, further comprising a further separating web arranged in the separator housing and separating the first and second subchamber, said deflection web engaging between the at least one separating web and the further separating web.

4. The operating medium tank arrangement of claim 3, wherein the further separating web extends further toward the guide insert than the at least one separating web.

5. The operating medium tank arrangement of claim 3, wherein the liquid separator has multiple support webs which extend into the filling tube and which support the at least one separating web and the further separating web on respective opposing sides of the at least one separating web and the further separating web.

6. The operating medium tank arrangement of claim 5, wherein the support webs are configured semicircular.

7. The operating medium tank arrangement of claim 2, wherein the guide insert has a first guide tube for receiving the refueling device, said operating tank arrangement further comprising a closure flap pivotally supported on the guide insert, and being movable into a first position in which it closes the first guide tube of the guide insert on a side of the first guide tube which faces the liquid separator and a second position in which it releases the first guide tube.

8. The operating medium tank arrangement of claim 7, wherein the guide insert has a second guide tube for receiving the refueling device, said second guide tube being spaced apart from the first guide tube, said deflection web being arranged on the second guide tube.

9. The operating medium tank arrangement of claim 3, wherein the at least one separating web, the further separating web and the deflection web extend parallel to each other.

10. The operating medium tank arrangement of claim 8, wherein the at least one separating web, the further separating web and the deflection web form an angle with a plane that is perpendicular to a longitudinal center axis of the second guide tube.

* * * * *